US012688442B2

(12) United States Patent
Osogami

(10) Patent No.: US 12,688,442 B2
(45) Date of Patent: Jul. 21, 2026

(54) ONLINE LEARNING OF MODEL PARAMETERS

(71) Applicant: INTERNATIONAL BUSINESS MACHINES CORPORATION, Armonk, NY (US)

(72) Inventor: Takayuki Osogami, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 16/173,582

(22) Filed: Oct. 29, 2018

(65) Prior Publication Data
US 2020/0134495 A1 Apr. 30, 2020

(51) Int. Cl.
G06N 7/00 (2023.01)
G06F 17/13 (2006.01)
G06F 17/16 (2006.01)
G06N 20/00 (2019.01)

(52) U.S. Cl.
CPC .............. *G06N 7/00* (2013.01); *G06F 17/13* (2013.01); *G06F 17/16* (2013.01); *G06N 20/00* (2019.01)

(58) Field of Classification Search
CPC ............ G06N 7/00; G06F 17/13; G06F 17/16
See application file for complete search history.

(56) References Cited

U.S. PATENT DOCUMENTS

| | | | | |
|---|---|---|---|---|
| 10,942,939 B2 * | 3/2021 | Li | ...................... | G06F 16/9535 |
| 11,120,361 B1 * | 9/2021 | Januschowski | ........ | G06N 3/084 |
| 11,144,683 B2 * | 10/2021 | Mestha | .................. | G06F 30/17 |
| 2018/0060744 A1 * | 3/2018 | Achin | .................. | G06N 20/00 |
| 2018/0101766 A1 | 4/2018 | He et al. | | |

OTHER PUBLICATIONS

Peng, Jian, Liefeng Bo, and Jinbo Xu. "Conditional neural fields." Advances in neural information processing systems 22 (2009). (Year: 2009).*
Heaton, Jeff. "An empirical analysis of feature engineering for predictive modeling." SoutheastCon 2016. IEEE, 2016. (Year: 2016).*
Wang, Xinying, and Min Han. "Improved extreme learning machine for multivariate time series online sequential prediction." Engineering Applications of Artificial Intelligence 40 (2015): 28-36. (Year: 2015).*

(Continued)

*Primary Examiner* — Renee D Chavez
*Assistant Examiner* — Pursottam Giri
(74) *Attorney, Agent, or Firm* — CHIP LAW GROUP

(57) ABSTRACT
Online learning of model parameters is performed by obtaining a first target value in a target sequence and a feature vector corresponding to the first target value. The feature vector includes a plurality of elements. The feature vector can be modified to obtain a modified feature vector by reducing an absolute value of at least one element of the feature vector. An inverse Hessian matrix can be generated recursively from a previous inverse Hessian matrix using at least the feature vector and the modified feature vector. Parameters of a model can be updated using the inverse Hessian matrix.

18 Claims, 6 Drawing Sheets

START

S200 — OBTAIN FIRST TARGET VALUE $y_{t+1}$

S210 — OBTAIN FEATURE VECTOR $\phi_t$

S220 — CALCULATE FIRST VECTOR $h_{t+1}$ FROM $h_t$

S230 — MODIFY FEATURE VECTOR $\phi_t \longrightarrow \hat{\phi}_t$

S240 — GENERATE INVERSE HESSIAN MATRIX $H_{t+1}^{-1}$ FROM $H_t^{-1}$

S250 — UPDATE MODEL PARAMETERS $\theta_{t+1}$

S260 — OBTAIN FEATURE VECTOR $\phi_{t+1}$ FOR PREDICTION

S270 — PREDICT FUTURE TARGET VALUE $\hat{y}_{t+2}$ BY USING $\theta_{t+1}$ AND $\phi_{t+1}$

END

(56) References Cited

OTHER PUBLICATIONS

Mirikitani, Derrick T., and Nikolay Nikolaev. "Recursive bayesian recurrent neural networks for time-series modeling." IEEE Transactions on Neural Networks 21.2 (2009): 262-274. (Year: 2009).*

Dosovitskiy, Alexey, et al. "Discriminative unsupervised feature learning with convolutional neural networks." Advances in neural information processing systems 27 (2014). (Year: 2014).*

Guo, Tian, et al. "Robust online time series prediction with recurrent neural networks." 2016 IEEE international conference on data science and advanced analytics (DSAA). Ieee, 2016. (Year: 2016).*

Tivive, Fok Hing Chi. A new class of convolutional neural networks based on shunting inhibition with applications to visual pattern recognition. Diss. University of Wollongong, 2006. (Year: 2006).*

Gower, Robert M., et al. "Tracking the gradients using the Hessian: A new look at variance reducing stochastic methods," arXiv preprint arXiv, Oct. 2017, 17 pages, 1710.07462.

Yao, Zhewei, et al. "Hessian-based Analysis of Large Batch Training and Robustness to Adversaries," arXiv preprint arXiv, Feb. 2018, 24 pages, 1802.08241.

Gay, Steven, "Dynamically regularized fast RLS with application to echo cancellation." Acoustics, Speech, and Signal Processing, 1996. ICASSP-96. Conference Proceedings., 1996 IEEE International Conference on, May 1996, pp. 957-960, 2.

Hazan, et al., Logarithmic Regret Algorithms for Online Convex Optimization, Retrieved from: https://web.archive.org/web/20091104174415/http://www.cs.princeton.edu:80/%7Eehazan/papers/log-journal.pdf, Nov. 4, 2009, 32 pages.

Horita, et al., A Leaky Rls Algorithm: Its Optimality and Implementation, In IEEE Transactions on Signal Processing, Oct. 2004, vol. 52, No. 10, pp. 2924-2936.

Osogami, et al., Bidirectional Learning for Time-series Models with Hidden Units, Retrieved from: https://web.archive.org/web/20250620064956/http://proceedings.mlr.press/v70/osogami17a/osogami17a.pdf, Apr. 15, 2025, 10 pages.

Tsakiris, et al. "On the regularization of the recursive least-squares algorithm", Area of Concentration, Electronic Systems, Dec. 2010, 63 pages.

Recursive Least Squares Filter, Retrieved from: https://web.archive.org/web/20160810142724/http://en.wikipedia.org/wiki/Recursive_least_squares_filter, Aug. 10, 2016, 9 pages.

* cited by examiner

ONLINE LEARNING OF MODEL PARAMETERS

BACKGROUND

Technical Field

The present invention relates to online learning of model parameters. More specifically, the present invention relates to an improvement of incremental learning of model parameters.

Description of the Related Art

Learning a data or pattern sequence (e.g., time-series data or numerical sequence) is frequently used for forecasting and anomaly detection in a variety of fields (e.g., predicting a stock price, finding a potential problem of a vehicle). Such pattern sequences are usually non-stationary, and thus, it is required to adopt online learning that will continuously update parameters of a prediction model while receiving new patterns. The accuracy of a prediction model can be improved if the prediction model is trained using available historical data of the pattern sequence every time a new pattern is observed. However, the computational cost can be prohibitively high in practical applications by using even the optimal currently available learning techniques to train the prediction model using the available historical data every time a new pattern is observed. Therefore, it is desired to improve the accuracy of incremental learning of a prediction model without repeating the training processes for each pattern in the available historical data

SUMMARY

According to an embodiment of the present invention, a computer-implemented method is provided that includes obtaining a first target value in a target sequence and a feature vector corresponding to the first target value, the feature vector including a plurality of elements, modifying the feature vector to obtain a modified feature vector by reducing an absolute value of at least one element of the feature vector, generating an inverse Hessian matrix recursively from a previous inverse Hessian matrix using at least the feature vector and the modified feature vector, and updating parameters of a model using the inverse Hessian matrix.

According to another embodiment of the present invention, a computer program product is provided that includes one or more computer readable storage mediums collectively storing program instructions that are executable by a processor or programmable circuitry to cause the processor or programmable circuitry to perform operations including obtaining a first target value in a target sequence and a feature vector corresponding to the first target value, the feature vector including a plurality of elements, modifying the feature vector to obtain a modified feature vector by reducing an absolute value of at least one element of the feature vector, generating an inverse Hessian matrix recursively from a previous inverse Hessian matrix using at least the feature vector and the modified feature vector, and updating parameters of a model using the inverse Hessian matrix.

According to another embodiment of the present invention, an apparatus is provided that includes a processor or a programmable circuitry, and one or more computer readable mediums collectively including instructions that, when executed by the processor or the programmable circuitry, cause the processor or the programmable circuitry to obtain a first target value in a target sequence and a feature vector corresponding to the first target value, the feature vector including a plurality of elements, modify the feature vector to obtain a modified feature vector by reducing an absolute value of at least one element of the feature vector, generate an inverse Hessian matrix recursively from a previous inverse Hessian matrix using at least the feature vector and the modified feature vector, and update parameters of a model using the inverse Hessian matrix.

The summary clause does not necessarily describe all necessary features of the embodiments of the present invention. The present invention can also be a sub-combination of the features described above.

BRIEF DESCRIPTION OF THE DRAWINGS

The following description will provide details of preferred embodiments with reference to the following figures wherein.

DETAILED DESCRIPTION

Machine learning has become a basic function of many computer systems, such that machine learning and neural network optimized processors have been developed. However, both general purpose and machine-learning-specific computer systems require extensive training in order to be effective. Since the initial training provided to a machine learning system cannot lake all potential situations or anomalies into consideration, the training is often on-going even during deployment of the model. Consequently, the machine learning system requires continuous updating (e.g., training) of the model parameters as new data is made available. Conventionally, such updating can often be time and resource consuming for the computer system, and thus, can become impractical once the model is deployed. The present invention provides computer-implemented methods, systems and program products that improve machine learning functionality in computer systems by implementing methods and systems for incrementally updating model parameters based on previous training, thus reducing time and processor resource requirements for maintaining up-to-date model parameters reflecting current data.

Hereinafter, example embodiments of the present invention will be described. The example embodiments shall not limit the invention according to the claims, and the combinations of the features described in the embodiments are not necessarily essential to the invention.

Figure 1:
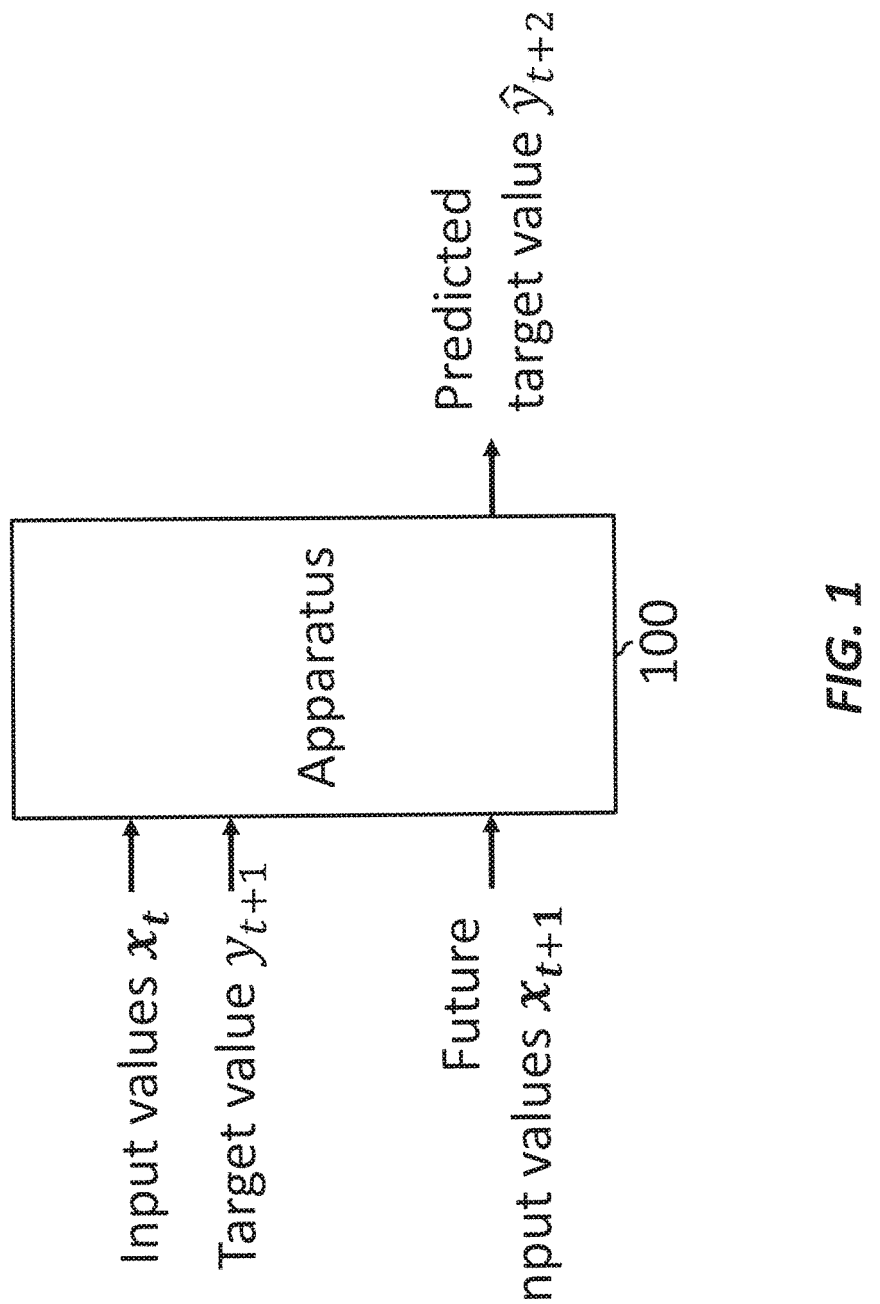
FIG. 1 shows an apparatus according to an embodiment of the present invention.

FIG. 1 shows apparatus 100 according to an embodiment of the present invention. Apparatus 100 obtains a target sequence $y_1, y_2, \ldots, y_{t+1}$, learns the target sequence, and predicts a target value in the target sequence which is not yet observed, such as $\hat{y}_{t+2}$. In this application, the target sequence is illustrated as a time-series sequence having a target value $y_t$ at each time t (t=0, 1, . . . ). In other embodiments, the target sequence is a numerical sequence having a target value $y_i$ at each index i (i=0, 1, . . . ). Apparatus 100 can also be used to predict a target value in a numerical sequence by replacing t to i in the following explanations.

In this embodiment, the target sequence relates or is expected to relate to an input sequence $x_0, x_1, \ldots, x_t$. In this case, apparatus 100 learns the relationship between the input sequence and the target sequence. Each input pattern (or input values) $x_t$ of the input sequence can be represented as a vector including N values (e.g., vector )).

$$x_t = \left(x_0^{[t]}, x_1^{[t]}, \cdots, x_N^{[t]}\right)$$

In this embodiment, apparatus 100 can obtain input pattern $x_t$ and target value $y_t$ at each time t, and predicts future (or succeeding) target value $y_{t+1}$ by calculating predicted target value $\hat{y}_{t+1}$ based on input patterns, model parameters, and other internal data received or generated before time t+1. Therefore, as shown in FIG. 1, apparatus 100 trains a prediction model at time t+1 by updating model parameters for time t+1 based on a relationship between input patterns before time t+1 (e.g., $x_0, x_1, \ldots, x_t$) and the target value $y_{t+1}$. Apparatus 100 can use updated model parameters for time t+1 to calculate future predicted target value $\hat{y}_{t+2}$ upon receiving future input pattern $x_{t+1}$. Since input pattern $x_t$ is the last input pattern that can affect future target value $y_{t+1}$, input pattern $x_t$ corresponds to future target value $y_{t+1}$.

In other embodiments, the target sequence may not relate or is not expected to relate to any input sequences. In such embodiments, apparatus 100 may not receive any input sequences for predicting future target value $\hat{y}$.

In this embodiment, the prediction model can be a linear model using a feature vector $\phi_t$. In the linear model, a predicted target value $\hat{y}_{t+1}$ can be calculated based on a weighted sum of elements of the feature vector for the predicted target value (e.g., feature vector $\phi_t$ for time t corresponding to the time t+1 under prediction). For example, apparatus 100 can predict a target value at time t+1 by using an inner product of parameter vector at time t (e.g., $\theta_t$) and a feature vector at time t (e.g., $\phi_t$) as shown in the following expression (1).

$$\hat{y}_{t+1} = \theta_t^T \phi_t \tag{1}$$

Feature vector $\phi_t$ can include a plurality of features $$\left(\phi_0^{[t]}, \phi_1^{[t]}, \cdots, \phi_{K-1}^{[t]}\right)$$

as vector elements. Each feature can be a function of at least one input pattern at time t or before time t, a function of time t, a function of the at least one input pattern and time t, or a constant. The following expression (2) shows an example of a feature vector $\phi_t$.

4

$$\phi_t = \left(1, x_1^{[t]}, x_2^{[t-1]}, \sum_{d \geq 0} \lambda^d x_1^{[t-d]}, \tanh\left(x_2^{[t]} + \tanh\left(x_3^{[t-1]}\right)\right), \ldots\right) \tag{2}$$

In expression (2), the first element, $$\phi_0^{[t]},$$

is a constant, 1, the second and third elements are functions of an input pattern, and the fourth and fifth elements are functions of two or more input patterns. Feature vector $\phi_t$ can also include a function of time t $$\left(\text{e.g., } \sin\frac{t}{M}\pi\right)$$

or a function of at least one input pattern and time t.

Although model parameters are updated in online training in this embodiment, the model parameters are constant values of the model at each time t. In this embodiment, a constant element is multiplied by a constant model parameter and becomes a constant term or a portion of the constant term of the model function shown in expression (1). The constant term of the model function is also referred to as an intercept of the model, and an element of the feature vector that is a constant is also referred to as an intercept component of the model.

In this embodiment, these functions of the feature vector can be predetermined or prefixed before starting the online learning. The provider or the user of apparatus 100 can define the mathematical form of feature vector $\phi_t$ that is expected to achieve higher accuracy in predicting the target sequence depending on the practical application of apparatus 100. Since feature vector $\phi_t$ can be determined before receiving the target sequence, and the target sequence can be predicted by combining the feature functions $\phi_0(t, x_0, x_1, \ldots, x_t)$, $\phi_1(t, x_0, x_1, \ldots, x_t)$, . . . , $\phi_{K-1}(t, x_0, x_1, \ldots, x_t)$, it can be preferred to include a variety of feature functions in the feature vector $\phi_t$.

An optimal goal for training a prediction model of apparatus 100 is to minimize a weighted mean squared error between the target sequence and the predicted target sequence as shown in the following expression (3). In expression (3), $\gamma$ is a forgetting factor, and $\theta_{t+1}$ is a parameter vector including trainable model parameters of the prediction model at time t+1.

$$\theta_{t+1} = \arg\min_\theta \left[\sum_{d=0}^{t} \gamma^d (y_{t+1-d} - \hat{y}_{t+1-d})^2\right] \tag{3}$$

Using expression (1), Expression (3) can be transformed into the following expression (4).

$$\theta_{t+1} = \arg\min_\theta \left[\sum_{d=0}^{t} \gamma^d (y_{t+1-d} - \phi_{t-d}^T \theta)^2\right] \tag{4}$$

The formula in the square bracket in expression (4) is minimized when the partial derivative of the formula with respect to every element of parameter vector $\theta$ equals 0, as shown in the following expression (5).

$$2\sum_{d=0}^{t}\gamma^d\left(y_{t+1-d} - \phi_{t-d}^T\theta\right)\phi_k^{[t-d]} = 0(k = 0, \ldots K - 1) \tag{5}$$

Expression (5) can be transformed into the following expression (6).

$$\sum_{d=0}^{t}\gamma^d\phi_k^{[t-d]}\phi_{t-d}^T\theta = \sum_{d=0}^{t}\gamma^d y_{t+1-d}\phi_k^{[t-d]}(k = 0, \ldots K - 1) \tag{6}$$

Expression (6) can be further transformed into the following expression (7).

$$\sum_{d=0}^{t}\gamma^d\phi_{t-d}\phi_{t-d}^T\theta = \sum_{d=0}^{t}\gamma^d y_{t+1-d}\phi_{t-d} \tag{7}$$

The matrix generated from a direct product of feature vector and feature vector on the left side of expression (7) can be regarded as a Hessian matrix $H_{t+1}$. The right side of expression (7) is based on a product of the target value and the feature vector at each time. By replacing the right side of expression (7) with a first vector $h_{t+1}$, expression (7) can be transformed into expression (8).

$$H_{t+1}\theta = h_{t+1} \tag{8}$$

Therefore, the parameter vector shown in expression (4) can be optimally calculated by expression (9), where $$H_{t+1}^{-1}$$

is an inverse Hessian matrix.

$$\theta_{t+1} = H_{t+1}^{-1}h_{t+1} \tag{9}$$

However, to avoid over-fitting, it can also be desirable to keep the model parameters smaller, or even as small as possible as long as the weighted mean squared error is also kept small. Therefore, it can be preferable to use expression (10) instead of using expression (3).

$$\theta_{t+1} = \operatorname*{argmin}_{\theta}\left[\sum_{d=0}^{t}\gamma^d(y_{t+1-d} - \hat{y}_{t+1-d})^2 + \text{Reg\_term}(\theta)\right] \tag{10}$$

In expression (10), "Reg_term($\theta$)" is a regularization term having a smaller value if the absolute values of the model parameters become smaller. Apparatus 100 can perform online training of a prediction model that can incrementally update model parameters $\theta_{t+1}$ without repeating, at each time t, training processes for each pair of a target value $y_{t+1-d}$ and a predicted target value $\hat{y}_{t+1-d}$ for all times d.

Figure 2:
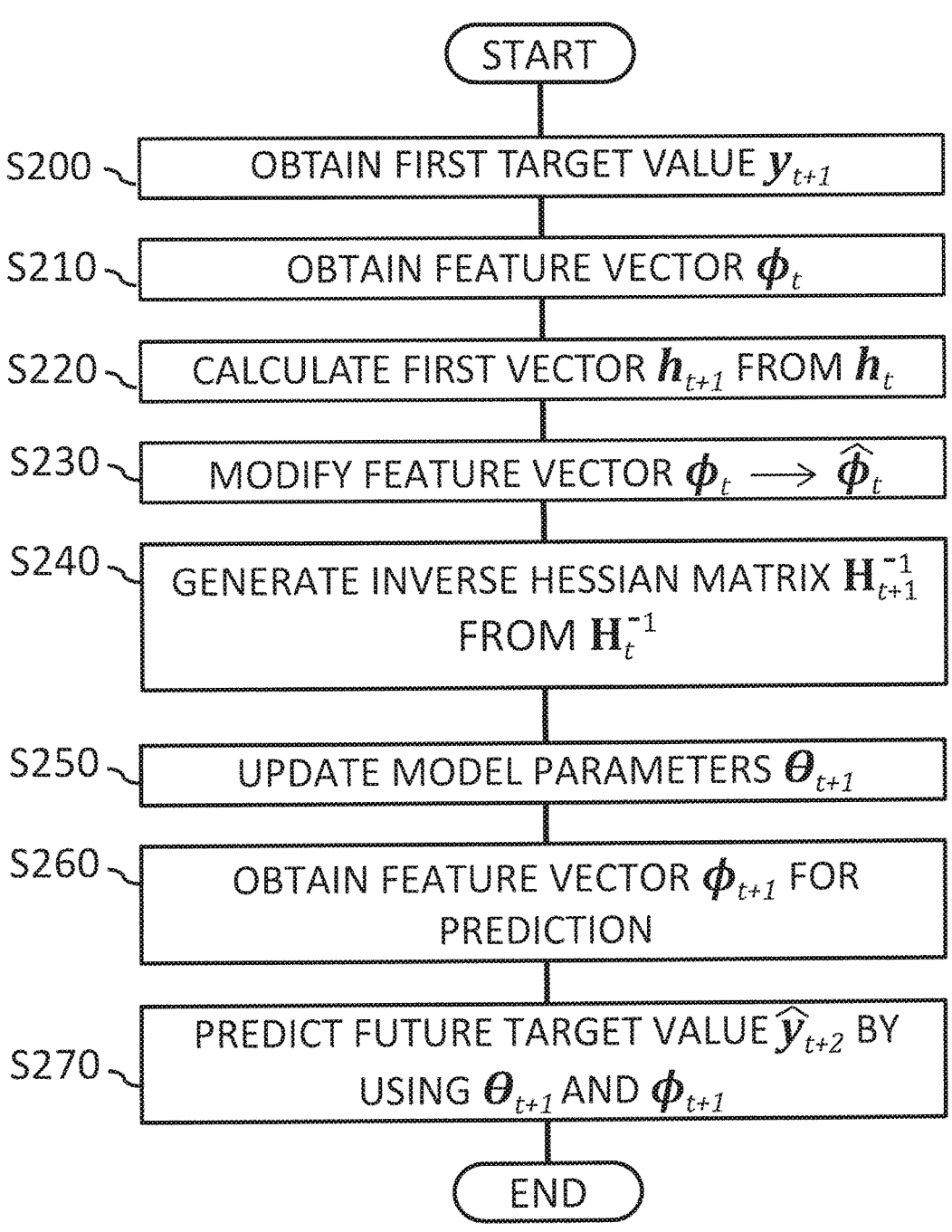
FIG. 2 shows an operational flow of incremental learning according to an embodiment of the present invention.

FIG. 2 shows an operational flow of incremental learning according to an embodiment of the present invention. The operations of FIG. 2 can be performed by, for example, apparatus 100 that were explained in reference to FIG. 1. While the operational flow of FIG. 2 will be explained in reference to apparatus 100, the operational flow can be performed by other apparatus having different components as well.

The operational flow of FIG. 2 is performed at time t+1. Before performing the operational flow of FIG. 2, the input sequence before time t (e.g., $x_0$, $x_1$, . . . , $x_{t-1}$) has already been received or observed, and first vector $h_t$ and inverse Hessian matrix $$H_t^{-1}$$

corresponding to previous time t has already been calculated.

At block S200, apparatus 100 obtains a first target value for time t+1 in the target sequence (e.g., target value $y_{t+1}$). In one implementation, apparatus 100 observes target value $y_{t+1}$ from one or more sensors, computers or other devices generating or receiving target value $y_{t+1}$. In other implementations, apparatus 100 reads target value $y_{t+1}$ from a memory or a storage storing the target sequence.

At block S210, apparatus 100 obtains a feature vector corresponding to the first target value (e.g., $\phi_t$, which is used at the same iteration of the operational flow). In one implementation, apparatus 100 receives or observes the newest input pattern corresponding to the first target value (e.g., $x_t$). Apparatus 100 has predetermined feature functions $\phi_0(t, x_0, x_1, \ldots, x_t)$, $\phi_1(t, x_0, x_1, \ldots, x_t)$, . . . , $\phi_{K-1}(t, x_0, x_1, \ldots, x_t)$, and calculates feature vector $\phi_t$ by calculating the predetermined feature functions based on the current time t and the current input sequence. In another implementation, apparatus 100 receives feature vector $\phi_t$ from one or more sequence generators, or other apparatuses outside of apparatus 100. In other embodiments, apparatus 100 has predetermined feature functions which are not based on the input sequence. In this case, apparatus 100 can calculate the predetermined feature functions without receiving or observing input sequences.

At block S220, apparatus 100 calculates a first vector (e.g., $h_{t+1}$) recursively from previous first vector $h_t$ using first target value $y_{t+1}$ and feature vector $\phi_t$. From the right side of expressions (7) and (8), the first vector can be updated or calculated from the previous first vector by multiplying the previous first vector by a forgetting factor and adding a product of the target value and the feature vector, as shown in the following expression (11). The first vector can be modified by, for example, adding other term that may not change the value of the first vector significantly.

$$h_{t+1} \leftarrow \gamma h_t + y_{t+1}\phi_t \tag{11}$$

At block S230, apparatus 100 modifies feature vector $\phi_t$ to obtain a modified feature vector (e.g., $\hat{\phi}_t$) by reducing an absolute value of at least one element of the feature vector. In this embodiment, apparatus 100 changes the at least one element of the feature vector to 0. This at least one element of the feature vector can be at least one intercept component of the model, also referred to as a constant feature. In another embodiment, apparatus 100 reduces an absolute value of at least one element of the feature vector by, for example, multiplying the at least one element of the feature vector by a reducing factor between 0 to 1 to obtain the modified feature vector. Modified feature vector $\hat{\phi}_t$ is used for implementing the regularization shown in expression (10) in the incremental learning of apparatus 100.

At block S240, apparatus 100 generates an inverse Hessian matrix (e.g., )

$$H_{t+1}^{-1}$$

recursively from a previous inverse Hessian matrix (e.g., $$H_t^{-1})$$

using at least the feature vector (e.g., $\phi_t$) and the modified feature vector (e.g., $\hat{\phi}_t$). In this embodiment, apparatus 100 calculates a temporal inverse Hessian matrix $$H'^{-1}_{t+1}$$

from the previous inverse Hessian matrix by using the feature vector. From the left side of expressions (7) and (8), apparatus 100 calculates the temporal inverse Hessian matrix as shown in the following expression (12).

$$H_{t+1}^{-1} \leftarrow \gamma^{-1} H_t^{-1} - \frac{\gamma^{-2} \phi_t \phi_t^\top}{1 + \gamma^{-1} \phi_t^\top H_t^{-1} \phi_t} \qquad (12)$$

To implement the regularization shown in expression (10), apparatus 100 calculates the inverse Hessian matrix from the temporal inverse Hessian matrix and the previous inverse Hessian matrix by using the modified feature vector as shown in the following expression (13), where $\lambda$ is a weight for the regularization term.

$$H_{t+1}^{-1} \leftarrow H_{t+1}^{-1} - \frac{\lambda \hat{\phi}_t \hat{\phi}_t^\top}{1 + \lambda \hat{\phi}_t^\top H_t^{-1} \hat{\phi}_t} \qquad (13)$$

At block S250, apparatus 100 updates parameters of the prediction model (e.g., $\theta_{t+1}$) using the inverse Hessian matrix calculated in block S240. In this embodiment, apparatus 100 also uses the first vector to update the parameters. Apparatus 100 can calculate the updated parameters by multiplying the inverse Hessian matrix and the first vector, as shown in expression (9).

At block S260, apparatus 100 obtains a feature vector corresponding to a future target value (e.g., a feature vector $\phi_{t+1}$ for calculating next target value $y_{t+2}$). Apparatus 100 can execute this step in the manner as described relating to block S210.

At block S270, apparatus 100 predicts the future target value in the target sequence by using the updated parameters and a feature vector corresponding to the future target value. In this embodiment, apparatus 100 predicts the future target value by calculating an inner product of the updated parameters and the feature vector corresponding to the future target value. Apparatus 100 can use the following expression (14) to calculate predicted target value $\hat{y}_{t+2}$.

$$\hat{y}_{t+2} = \theta_{t+1}^T \phi_{t+1} \qquad (14)$$

In this embodiment, apparatus 100 can calculate all parameters including first vector $h_{t+1}$ and inverse Hessian matrix $$H_{t+1}^{-1}$$

incrementally or recursively based on previous values, such as $h_t$ and $$H_t^{-1},$$

without repeating the training processes for each pattern in the available historical data at each time step. Furthermore, apparatus 100 can update model parameters to decrease or minimize the weighted mean square error between the target sequence and the predicted target sequence by adopting expression (10).

By using the modified feature vector in generating the inverse Hessian matrix, apparatus 100 implements the regularization term in expression (10). More specifically, apparatus 100 uses the following expression (15) instead of using expression (3), where $\lambda$ is a weight for the regularization term as shown in expression (13).

$$\theta_{t+1} = \underset{\theta}{\operatorname{argmin}} \left[ \sum_{d=0}^{t} \gamma^d (y_{t+1-d} - \phi_{t-d}^\top \theta)^2 + \lambda \|\theta\|_{H_t}^2 \right] \qquad (15)$$

The second term in the square bracket in expression (15) is an L2 regularization term which gives decreasing effect to the model parameters. By zeroing or reducing an absolute value of at least one element of the feature vector, factors relating to the at least one element are not subtracted from temporal inverse Hessian matrix $$H'^{-1}_{t+1}$$

in expression (13), but factors relating to the other elements of the feature vector are subtracted from temporal inverse Hessian matrix $$H'^{-1}_{t+1}.$$

Because the inverse Hessian matrix is reduced with respect to elements of the feature vector other than the at least one element, model parameters $\theta_{t+1}$ are decreased with respect to elements of the feature vector other than the at least one element. The inverse Hessian matrix is not reduced with respect to the at least one element because a constant or an intercept of the predicted target sequence is preferable not to be reduced or changed from expression (3).

In other embodiments, apparatus 100 can reduce an absolute value of at least one intercept of at least one feature function $\phi_k(t, x_0, x_1, \ldots, x_t)$, or change the at least one intercept of the at least one feature function to 0 at block S230. Apparatus 100 can reduce or change the intercept of every feature functions $\phi_k(t, x_0, x_1, \ldots, x_t)$ for k=0, ..., K−1.

In other embodiments, apparatus 100 can reduce or change at least one element of the feature vector at block S230 in order to keep factors relating to at least one important feature, which may not be an intercept component of the model, not subtracted from the inverse Hessian matrix at block S240.

Figure 3:
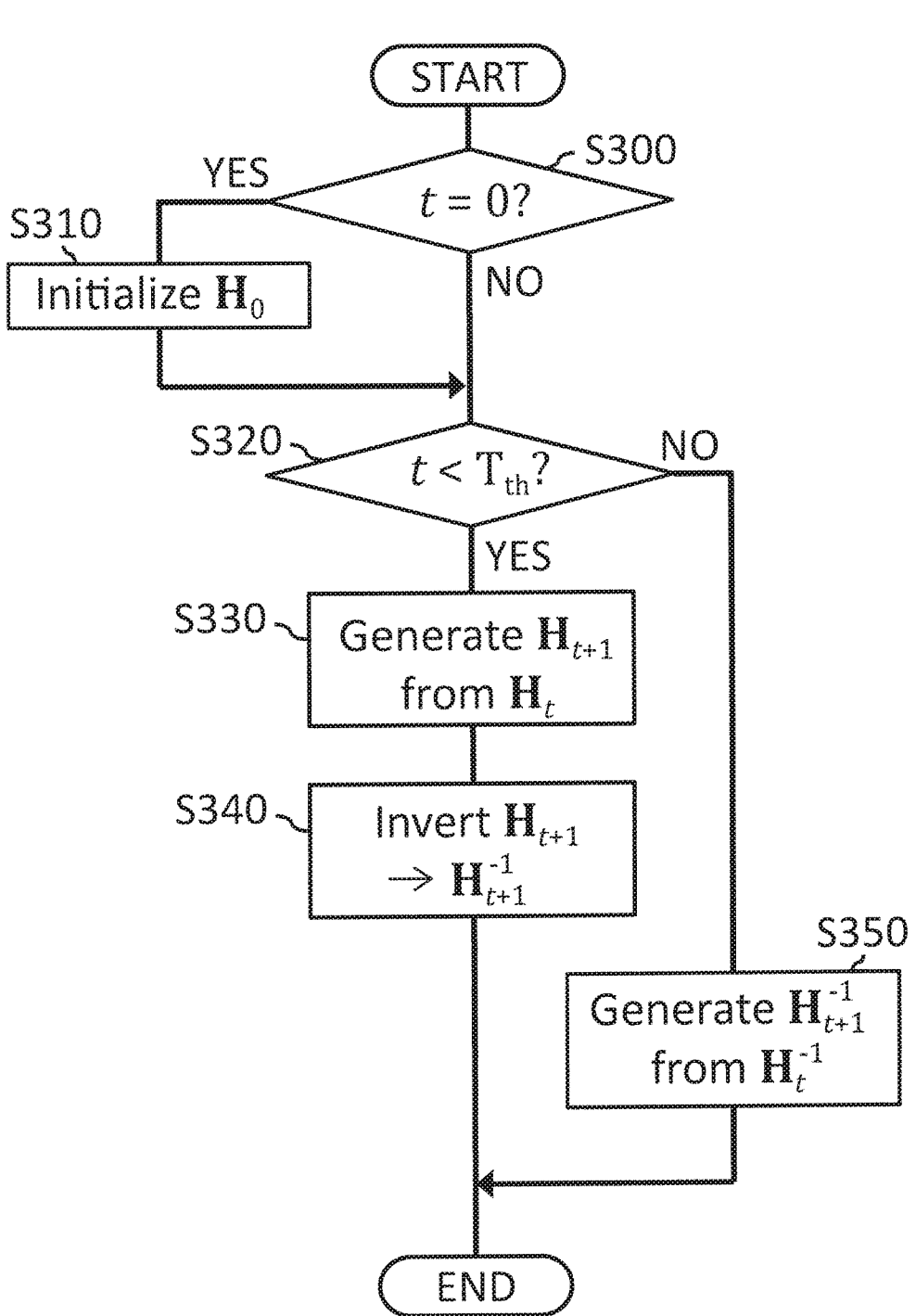
FIG. 3 shows an operational flow of generating an inverse Hessian matrix according to an embodiment of the present invention.

FIG. 3 shows an operational flow of generating an inverse Hessian matrix according to an embodiment of the present invention. The operations of FIG. 3 can be performed by, for example, apparatus 100 that were explained in reference to FIG. 1. While the operational flow of FIG. 3 will be explained in reference to apparatus 100, the operational flow can be performed by other apparatus having different components as well. The operations of FIG. 3 can be included in S240 of FIG. 2.

As shown in expressions (7) and (8), the Hessian matrix is defined as shown in the following expression (16).

$$H_{t+1} = \sum_{d=0}^{t} \gamma^d \phi_{t-d} \phi_{t-d}^T \qquad (16)$$

In the beginning or early timing near t=0, there is a possibility that the Hessian matrix and the inverse Hessian matrix will fluctuate greatly. In this situation, each matrix element of the Hessian matrix becomes a very small value, and then some matrix elements of the inverse Hessian matrix become very large value. Therefore, it can be difficult or not practical to update inverse Hessian matrix $$H_{t+1}^{-1}$$

from previous inverse Hessian matrix $$H_t^{-1}.$$

In this situation, apparatus 100 can adopt the operations of FIG. 3. In the operations of FIG. 3, apparatus 100 generates, for a second target value (before threshold time $T_{th}$) preceding a first target value (at or after threshold timing $T_{th}$), Hessian matrix $H_{t+1}$ recursively from previous Hessian matrix $H_t$ by using a feature vector corresponding to the second target value (e.g., $\phi_t$). Then, apparatus 100 inverts the Hessian matrix for the second target value to obtain inverse Hessian matrix $$H_{t+1}^{-1}.$$

At block S300, apparatus 100 determines whether it is the initial generation time for the Hessian matrix (e.g., time t=0). If it is the initial generation time for the Hessian matrix, then apparatus 100 initializes Hessian matrix $H_0$ at block S310. From the definition shown in expression (16), apparatus 100 can initialize Hessian matrix $H_0$ as a zero matrix.

At block S320, apparatus 100 determines whether the current time is before threshold time $T_{th}$. If the current time is before the threshold time, apparatus 100 generates, at block S330, Hessian matrix $H_{t+1}$ recursively from previous Hessian matrix $H_t$. From the definition of expression (16), apparatus 100 can generate the Hessian matrix by using the following expression (17).

$$H_{t+1} = \gamma H_t + \phi_t \phi_t^T \qquad (17)$$

In expression (17), Hessian matrix $H_{t+1}$ is calculated by multiplying previous Hessian matrix $H_t$ by forgetting factor $\gamma$ and adding feature vector $\phi_t$ multiplied by a transpose of feature vector $\phi_t$ (e.g., a direct product of feature vector $\phi_t$ and feature vector $\phi_t$). Expression (12) is an expression for calculating an inverse matrix of Hessian matrix $H_{t+1}$ shown in expression (17).

To implement the L2 regularization of expression (15) also in the early timing, apparatus 100 can generate the Hessian matrix by using the following expression (18) instead of the expression (17).

$$H_{t+1} = \gamma H_t + \phi_t \phi_t^T + \lambda \hat{\phi}_t^T H_t \hat{\phi}_t \qquad (18)$$

In expression (18), modified feature vector $\hat{\phi}_t$ multiplied by previous Hessian matrix $H_t$, a transpose of modified feature vector $$\phi_t^T,$$

and weight $\lambda$ is further added to the Hessian matrix of expression (17). Expression (13) is an expression for calculating an inverse matrix of Hessian matrix $H_{t+1}$ of expression (18). In other embodiments, expression (18) can be modified by, for example, adding other terms or modifying the third term for modifying the regularization term of expression (10). Expression (13) is also modified for calculating an inverse matrix of Hessian matrix $H_{t+1}$ of modified expression (18).

At block S340, apparatus 100 inverts Hessian matrix $H_{t+1}$ to obtain inverse Hessian matrix $$H_{t+1}^{-1}.$$

If the current time is at or after the threshold time at block S320, apparatus 100 generates, at block S350, inverse Hessian matrix $$H_{t+1}^{-1}$$

from previous inverse Hessian matrix $$H_t^{-1}$$

as shown in FIG. 2 with respect to block S240.

In this embodiment, apparatus 100 can generate the inverse Hessian matrix from the Hessian matrix and can avoid the difficulty of generating the inverse Hessian matrix from the previous inverse Hessian matrix. In other embodiments, apparatus 100 can skip block S340 until the current time becomes $T_{th}$ and perform block S340 at time $t=T_{th}$. In these embodiments, apparatus 100 may not execute block S250, block S260, and block S270 before $T_{th}$, and then apparatus 100 may not predict the target values at early timings. This is acceptable because the accuracy of prediction at early timings is very low for most applications.

Figure 4:
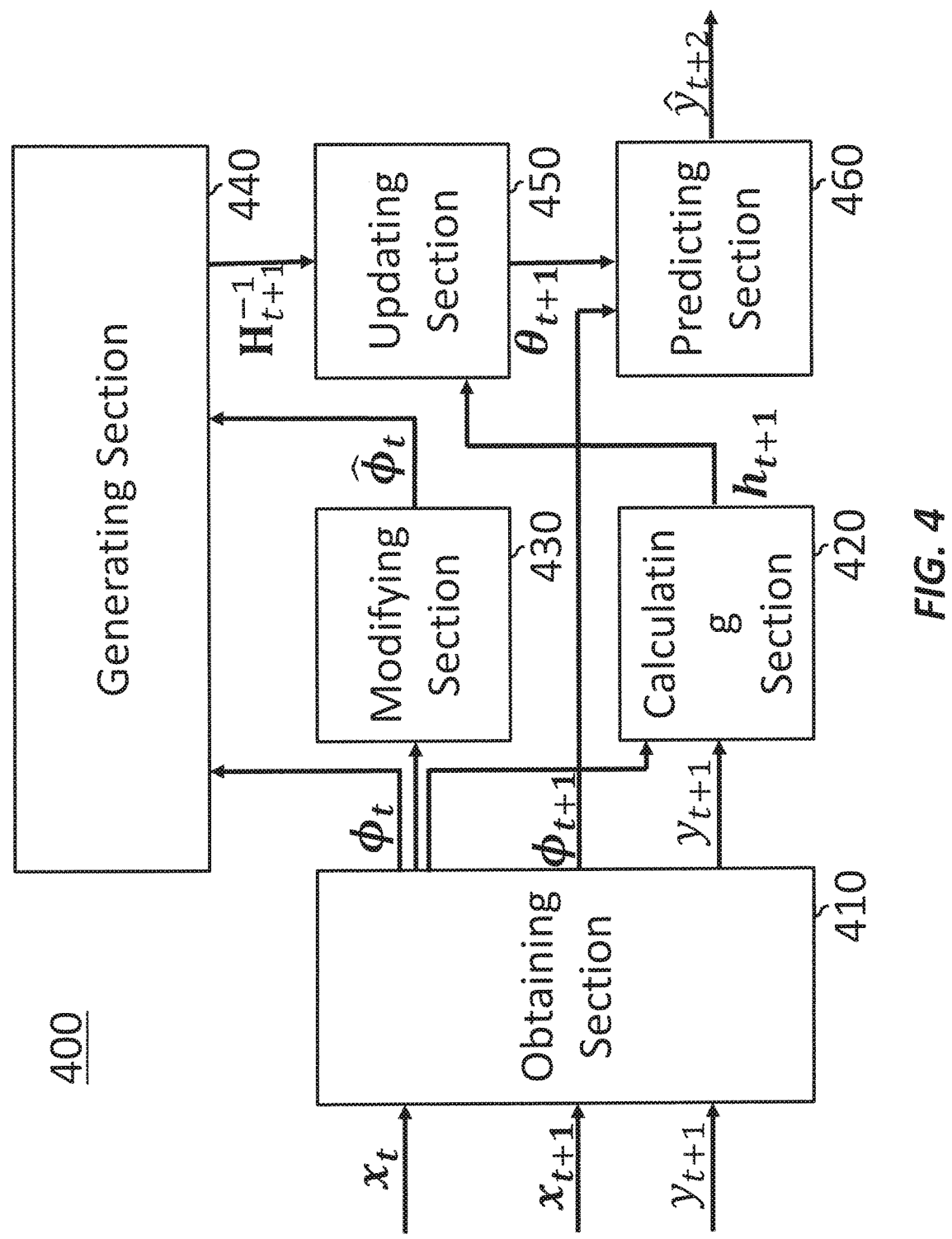
FIG. 4 shows an apparatus according to an embodiment of the present invention.

FIG. 4 shows an apparatus 400 according to an embodiment of the present invention. Apparatus 400 can be a detailed version of apparatus 100 of FIG. 1 or an apparatus other than apparatus 100. In this embodiment, apparatus 400 can perform operations of FIGS. 2 and 3. While apparatus 400 will be explained in reference to apparatus 100 of FIG. 1 and operations of FIGS. 2 and 3, apparatus 400 can perform other operations as well.

Apparatus 400 includes obtaining section 410, calculating section 420, modifying section 430, generating section 440, updating section 450, and predicting section 460. At each time t, obtaining section 410 obtains input pattern $x_t$ and target value $y_t$. In this embodiment, obtaining section 410 performs operations of block S200 in FIG. 2.

Obtaining section 410 stores a feature function for each feature of feature vector $\phi_t$. For updating model parameters $\theta$ for time t+1, obtaining section 410 obtains feature vector $\phi_t$ by calculating each feature in $\phi_t$ based on predetermined functions which can input time t and/or the input sequence at or before time t. In this embodiment, obtaining section 410 performs operations of block S210 in FIG. 2. Obtaining section 410 outputs feature vector $\phi_t$ into calculating section 420, modifying section 430 and generating section 440, and outputs target value $y_{t+1}$ to calculating section 420 at time t+1.

For prediction at time t+1, obtaining section 410 obtains feature vector $\phi_{t+1}$ by calculating each feature in $\phi_{t+1}$. In this embodiment, obtaining section 410 performs operations of block S260 in FIG. 2. Obtaining section 410 outputs feature vector $\phi_{t+1}$ to predicting section 460 at time t+1. Obtaining section 410 can include sub-sections for performing sub-functions such as obtaining the input pattern or the input sequence, obtaining the target value or the target sequence, and obtaining the feature vector, as described in the flow chart of FIG. 2. Such sub-sections can be referred to by a name associated with their sub-functions.

Calculating section 420 is connected to obtaining section 410. Calculating section 420 stores first vector $h_t$ and forgetting factor $\gamma$. At time t+1, calculating section 420 receives target value $y_{t+1}$ and feature vector $\phi_t$ from obtaining section 410, and calculates first vector $h_{t+1}$ for time t+1 recursively from a previous first vector $h_t$ based on first target value $y_{t+1}$ and the feature vector $\phi_t$. In this embodiment, calculating section 420 performs the operations of block S220 in FIG. 2. Calculating section 420 outputs first vector $h_{t+1}$ to updating section 450.

Modifying section 430 is connected to obtaining section 410. At time t+1, modifying section 430 receives feature vector $\phi_t$ from obtaining section 410, and modifies the feature vector to obtain a modified feature vector $\hat{\phi}_t$. In this embodiment, modifying section 430 performs the operations of block S230 in FIG. 2. Modifying section 430 outputs modified feature vector $\hat{\phi}_t$ to generating section 440.

Generating section 440 is connected to obtaining section 410 and modifying section 430. Generating section 440 stores inverse Hessian matrix $$H_t^{-1},$$

forgetting factor $\gamma$, and weight $\lambda$. Generating section 440 can store Hessian matrix $H_t$ if generating section 440 performs block S310, block S330, and block S340 in FIG. 3. At time t+1, generating section 440 receives feature vector $\phi_t$ from obtaining section 410 and modified first vector $\hat{\phi}_t$ from modifying section 430. Generating section 440 generates inverse Hessian matrix $$H_{t+1}^{-1}$$

for time t+1 based on previous inverse Hessian matrix $$H_t^{-1},$$

feature vector $\phi_t$, and modified feature vector $\hat{\phi}_t$. In this embodiment, generating section 440 performs operations of block S240 in FIG. 2. Generating section 440 can also perform operations of FIG. 3. In this case, generating section 440 can generate inverse Hessian matrix $$H_{t+1}^{-1}$$

for time t+1 based on previous Hessian matrix $H_t$, feature vector $\phi_t$, and modified feature vector $\hat{\phi}_t$. Generating section 440 outputs inverse Hessian matrix $$H_{t+1}^{-1}$$

to updating section 450.

Updating section 450 is connected to calculating section 420 and generating section 440. At time t+1, updating section 450 receives first vector $h_{t+1}$ from calculating section 420 and inverse Hessian matrix $$H_{t+1}^{-1}$$

from generating section 440 and updates model parameters $\theta_{t+1}$ based on first vector $h_{t+1}$ and inverse Hessian matrix $$H_{t+1}^{-1}.$$

In this embodiment, updating section 450 performs the operations of block S250 in FIG. 2.

Predicting section 460 is connected to obtaining section 410 and updating section 450. At time t+1, predicting section 460 receives feature vector $\phi_{t+1}$ from obtaining section 410 and model parameters $\theta_{t+1}$ from updating section 450. Predicting section 460 predicts future target value $y_{t+2}$ by calculating predicted target value $\hat{y}_{t+2}$ for time t+2 based on feature vector $\phi_{t+1}$ and model parameters $\theta_{t+1}$. In this embodiment, predicting section 460 performs the operations of block S270 in FIG. 2.

Figure 5:
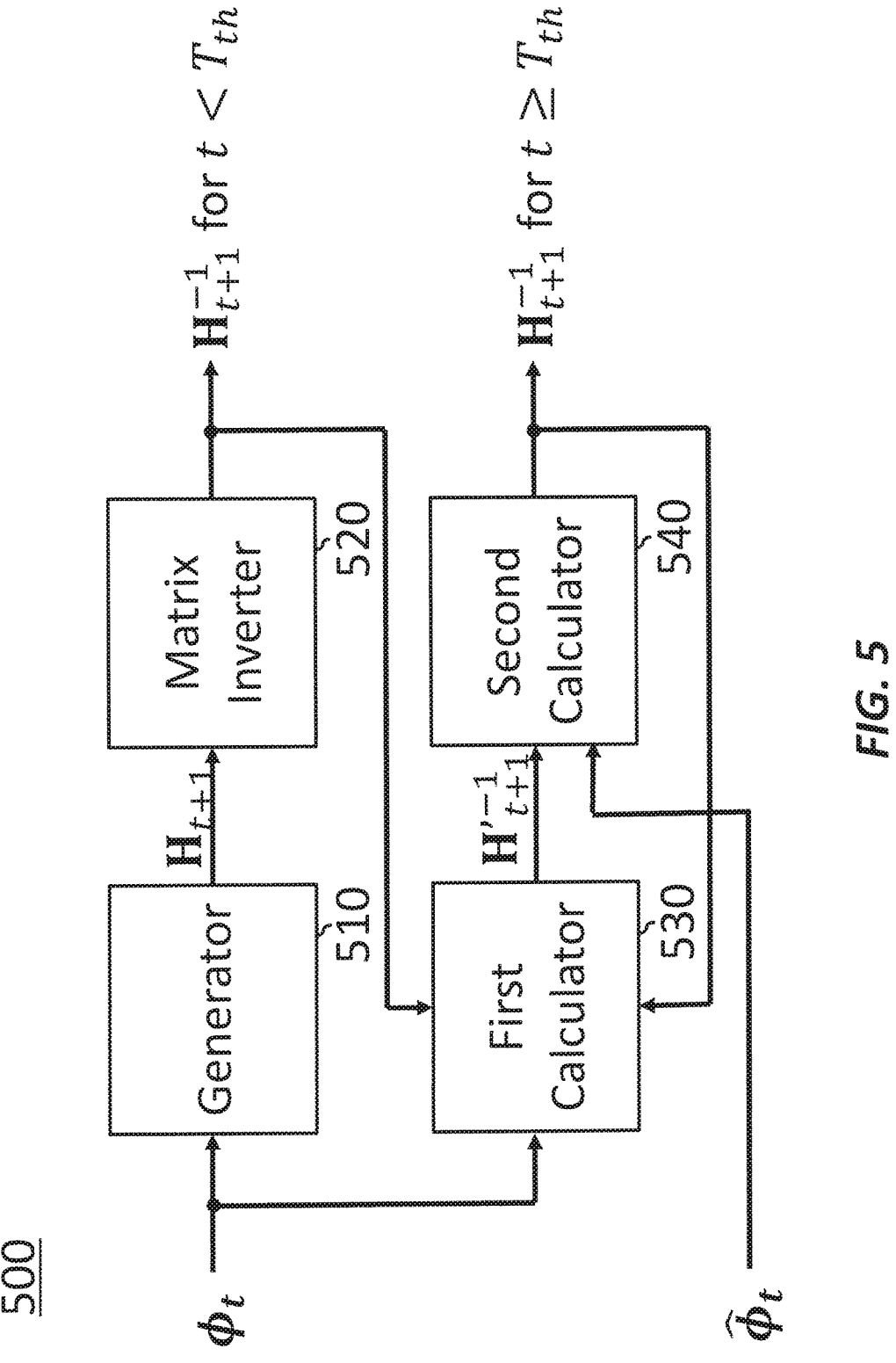
FIG. 5 shows a configuration of a generating section according to an embodiment of the present invention.

FIG. 5 shows a configuration of generating section 500 according to an embodiment of the present invention. Generating section 500 can be used as generating section 440 in FIG. 4. In other implementations, generating section 500 can be used as a generating section of other apparatus. In this embodiment, generating section 500 can perform operations of FIG. 3. While generating section 500 will be explained in reference to apparatus 100 of FIG. 1, apparatus 400 of FIG. 4, and operations of FIGS. 2 and 3, generating section 500 can perform other operations as well.

Generating section 500 includes generator 510, matrix inverter 520, first calculator 530, and second calculator 540. Generator 510 stores Hessian matrix $H_t$ and forgetting factor $\gamma$. generator 510 receives feature vector $\phi_t$ at time t+1 if t is less than threshold time $T_{th}$, and generates Hessian matrix $H_{t+1}$ based on previous Hessian matrix $H_t$ and feature vector $\phi_t$. At time 0, generator 510 initializes Hessian matrix $H_0$. In this embodiment, generator 510 performs block S300, block S310, block S320, and block S330 of FIG. 3.

Matrix inverter 520 is connected to generator 510. Matrix inverter 520 receives Hessian matrix $H_{t+1}$ at time t+1 and calculates an inverse matrix of Hessian matrix $H_{t+1}$ (e.g., inverse Hessian matrix ).

$$H_{t+1}^{-1}).$$

In this embodiment, matrix inverter 520 performs block S340 of FIG. 3. Matrix inverter 520 outputs inverse Hessian matrix $$H_{t+1}^{-1}$$

to first calculator 530 and an updating section such as updating section 450 in FIG. 4.

First calculator 530 is connected to matrix inverter 520 and second calculator 540. First calculator 530 stores inverse Hessian matrix $$H_t^{-1}.$$

At time t+1, if t is equal to or more than threshold time $T_{th}$, then first calculator 530 receives feature vector $\phi_t$ and calculates temporal inverse Hessian matrix $$H'^{-1}_{t+1}$$

from previous inverse Hessian matrix $$H_t^{-1}$$

based on feature vector $\phi_t$. In this embodiment, first calculator 530 performs block S240 of FIG. 2 or block S350 of FIG. 3 with respect to the calculation of temporal inverse Hessian matrix $$H'^{-1}_{t+1}.$$

First calculator 530 outputs temporal inverse Hessian matrix $$H'^{-1}_{t+1}$$

to second calculator 540.

At time t+1, if t is less than threshold time $T_{th}$ or t is equal to $T_{th}-1$, then first calculator 530 receives inverse Hessian matrix $$H_{t+1}^{-1}$$

from matrix inverter 520, and update the inverse Hessian matrix stored in a memory of first calculator 530 with received Hessian matrix $$H_{t+1}^{-1}.$$

If t is equal to or more than threshold time $T_{th}$, first calculator 530 receives inverse Hessian matrix $$H_{t+1}^{-1}$$

from second calculator 540, and updates the inverse Hessian matrix in the memory with received Hessian matrix $$H_{t+1}^{-1}.$$

Second calculator 540 is connected to first calculator 530. At time t+1, if t is equal to or more than threshold time $T_{th}$, then second calculator 540 calculates inverse Hessian matrix $$H_{t+1}^{-1}$$

from temporal inverse Hessian matrix $$H'^{-1}_{t+1}$$

based on modified feature vector $\hat{\phi}_t$. In this embodiment, second calculator 540 performs block S240 of FIG. 2 or block S350 of FIG. 3 with respect to the calculation of inverse Hessian matrix $$H_{t+1}^{-1}$$

from temporal inverse Hessian matrix $$H'^{-1}_{t+1}.$$

Second calculator 540 outputs inverse Hessian matrix $$H_{t+1}^{-1}$$

to first calculator 530 and an updating section such as updating section 450 in FIG. 4.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

Computer-readable media can include any tangible device that can store instructions for execution by a suitable device, such that the computer-readable medium having instructions stored therein includes an article of manufacture including instructions which can be executed to create means for performing operations specified in the flowcharts or block diagrams. Examples of computer-readable media can include an electronic storage medium, a magnetic storage medium, an optical storage medium, an electromagnetic storage medium, a semiconductor storage medium, etc. More specific examples of computer-readable media can include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions can include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

Computer-readable instructions can be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 6:
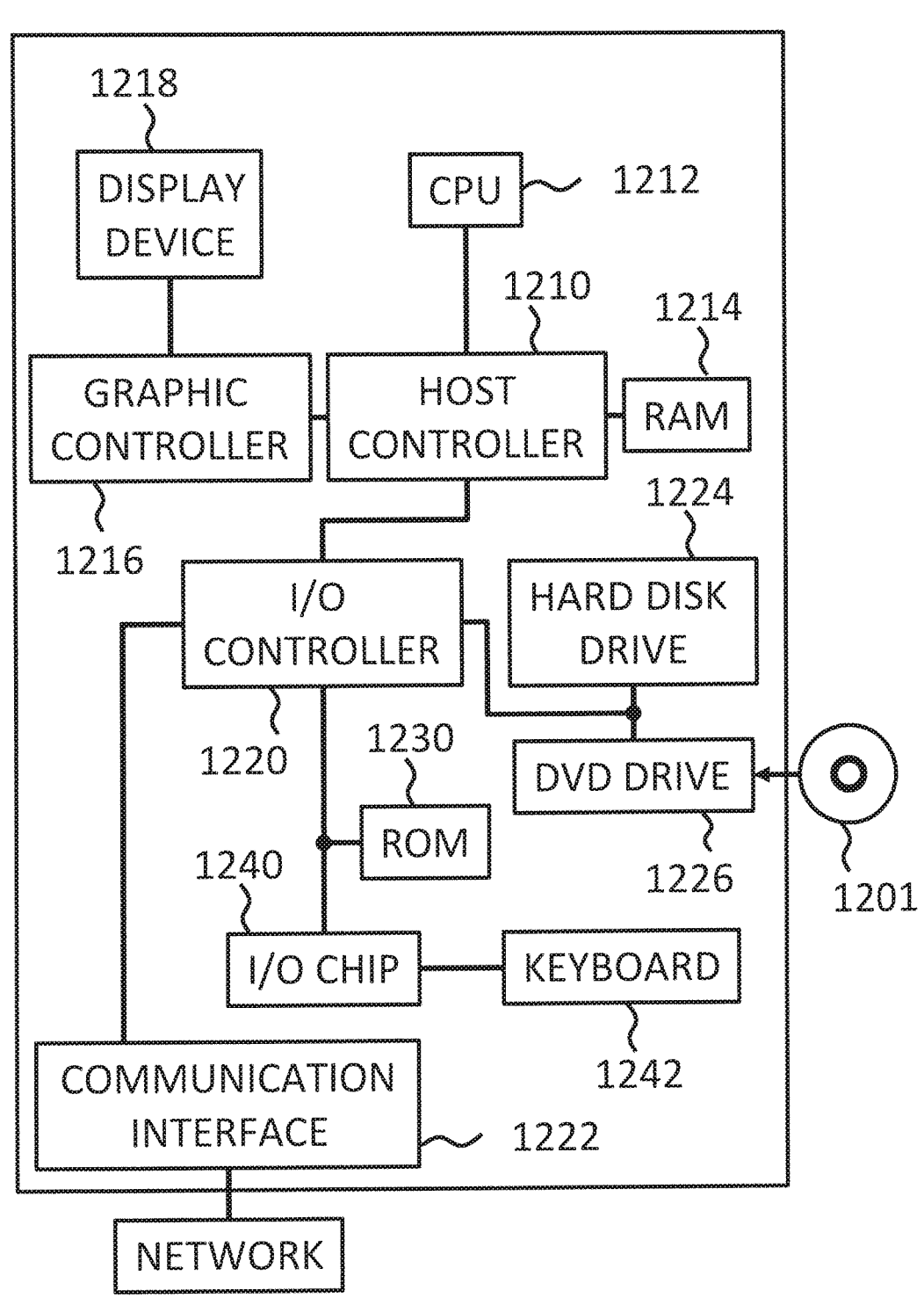
FIG. 6 shows an exemplary hardware configuration of a computer according to an embodiment of the present invention.

FIG. 6 shows an example of a computer 1200 in which aspects of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program can be provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also be apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for enhancing performance of a trained machine learning model by additional machine learning model training after initial machine learning model deployment, comprising:

obtaining a first target value in a target sequence and a feature vector corresponding to the first target value, the feature vector including a plurality of elements having new data patterns;

dynamically adjusting the feature vector responsive to time-variant characteristic data of the target sequence and the feature vector to generate a modified feature vector by:

reducing an absolute value of at least one element of the feature vector using a multiplication reducing factor between 0 to 1 responsive to an intercept component as at least one element of the feature vector being a constant feature; and updating the intercept component of the trained machine learning model to zero;

iteratively optimizing the trained machine learning model by reducing processing time and processor resource utilization for continuous online training of the trained machine learning model trained for predicting an anomaly with newly detected time-variant characteristic data by applying training processes of a previous training to each data pattern in available historical data at each time step only once while regularizing model parameters of the trained machine learning model to maintain model parameters reflecting previous training including:

generating an inverse Hessian matrix recursively, based on the previous training from a previous inverse Hessian matrix using a difference of a temporal inverse Hessian matrix and a proportion based on at least the feature vector, the modified feature vector, a transpose of the modified feature vector, the previous inverse Hessian matrix, and a regularization weight, the inverse Hessian matrix maintains the model parameters proportional to a weighted mean squared error between the target sequence and a future target value to avoid overfitting;

updating the model parameters of the trained machine learning model for continuous online training with only newly detected time-variant characteristic data from the target sequence using the modified feature vector and the recursively generated inverse Hessian matrix;

predicting a future target value in the target sequence based on an inner product of the updated model parameters and a feature vector corresponding to the future target value; and minimizing the weighted mean squared error between the target sequence and the future target value.

2. The computer-implemented method of claim 1, further comprising predicting a future target value in the target sequence by using the updated parameters and a feature vector corresponding to the future target value.

3. The computer-implemented method of claim 1, further comprising calculating a first vector recursively from a previous first vector using the first target value and the feature vector, wherein updating parameters of the machine learning model further uses the first vector to update the machine learning model parameters.

4. The computer-implemented method of claim 3, wherein updating parameters of the machine learning model includes calculating the parameters by multiplying the inverse Hessian matrix and the first vector.

5. The computer-implemented method of claim 1, wherein the at least one element of the feature vector includes at least one intercept component of the machine learning model.

6. The computer-implemented method of claim 1, wherein generating the inverse Hessian matrix includes:

generating, for a second target value preceding the first target value in the target sequence, a Hessian matrix recursively from a previous Hessian matrix by using a feature vector corresponding to the second target value; and inverting the Hessian matrix for the second target value to obtain the inverse Hessian matrix.

7. The computer-implemented method of claim 1, wherein generating the inverse Hessian matrix includes:

calculating the temporal inverse Hessian matrix from the previous inverse Hessian matrix by using the feature vector; and calculating the inverse Hessian matrix from the temporal inverse Hessian matrix and the previous inverse Hessian matrix by using the modified feature vector.

8. The computer-implemented method of claim 7, wherein calculating the inverse Hessian matrix from the temporal inverse Hessian matrix and the previous inverse Hessian matrix includes calculating the inverse Hessian matrix by:

$$H_{t+1}^{-1} \leftarrow H_{t+1}'^{-1} - \frac{\lambda \hat{\phi}_t \hat{\phi}_t^T}{1 + \lambda \hat{\phi}_t^T H_t^{-1} \hat{\phi}_t}$$

where $$H_{t+1}^{-1}$$

is the inverse Hessian matrix, $$H_{t+1}'^{-1}$$

is the temporal inverse Hessian matrix, $$H_t^{-1}$$

is the previous inverse Hessian matrix, $\hat{\phi}_t$ is the modified feature vector, and $\lambda$ is a weight for regularization.

9. A computer program product including one or more non-transitory computer readable storage mediums collectively storing program instructions that are executable by a processor or programmable circuitry to cause the processor or programmable circuitry to perform operations for enhancing performance of a trained machine learning model by additional machine learning model training after initial machine learning model deployment, comprising:

obtaining a first target value in a target sequence and a feature vector corresponding to the first target value, the feature vector including a plurality of elements having new data patterns;

dynamically adjusting the feature vector responsive to time-variant characteristic data of the target sequence and the feature vector to generate a modified feature vector by:

reducing an absolute value of at least one element of the feature vector using a multiplication reducing factor between 0 to 1 responsive to an intercept component as at least one element of the feature vector being a constant feature; and updating the intercept component of the trained machine learning model to zero;

iteratively optimizing the trained machine learning model by reducing processing time and processor resource utilization for continuous online training of the trained machine learning model trained for predicting an anomaly with newly detected time-variant characteristic data by applying training processes of a previous training to each data pattern in available historical data at each time step only once while regularizing model parameters of the trained machine learning model to maintain model parameters reflecting previous training including:

generating an inverse Hessian matrix recursively, based on the previous training from a previous inverse Hessian matrix using a difference of a temporal inverse Hessian matrix and a proportion based on at least the feature vector, the modified feature vector, a transpose of the modified feature vector, the previous inverse Hessian matrix, and a regularization weight, the inverse Hessian matrix maintains the model parameters proportional to a weighted mean squared error between the target sequence and a future target value to avoid overfitting;

updating model parameters of the trained machine learning model for continuous online training with only newly detected time-variant characteristic data from the target sequence using the modified feature vector and the recursively generated inverse Hessian matrix predicting a future target value in the targe t sequence based on an inner product of the updated model parameters and a feature vector corresponding to the future target value; and minimizing the weighted mean squared error between the target sequence and the future target value.

10. The computer program product of claim 9, comprising predicting a future target value in the target sequence by using the updated parameters and a feature vector corresponding to the future target value.

11. The computer program product of claim 9, wherein modifying the feature vector includes changing the at least one element of the feature vector to 0.

12. The computer program product of claim 11, wherein the at least one element of the feature vector includes at least one intercept component of the machine learning model.

13. The computer program product of claim 9, wherein generating the inverse Hessian matrix includes:

calculating the temporal inverse Hessian matrix from the previous inverse Hessian matrix by using the feature vector; and calculating the inverse Hessian matrix from the temporal inverse Hessian matrix and the previous inverse Hessian matrix by using the modified feature vector.

14. An apparatus for additional machine learning model training after initial machine learning model deployment, comprising:

a processor or a programmable circuitry; and one or more computer readable mediums collectively including instructions that, when executed by the processor or the programmable circuitry, cause the processor or the programmable circuitry to:

obtain a first target value in a target sequence and a feature vector corresponding to the first target value, the feature vector including a plurality of elements having new data patterns;

dynamically adjust the feature vector responsive to time-variant characteristic data of the target sequence and the feature vector to generate a modified feature vector by:

reducing an absolute value of at least one element of the feature vector using a multiplication reducing factor between 0 to 1 responsive to an intercept component as at least one element of the feature vector being a constant feature; and updating the intercept component of the trained machine learning model to zero;

iteratively optimize the trained machine learning model by reducing processing time and processor resource utilization for continuous online training of the trained machine learning model trained for predicting an anomaly with newly detected time-variant characteristic data by applying training processes of a previous training to each data pattern in available historical data at each time step only once while regularizing model parameters of the trained machine learning model to maintain model parameters reflecting previous training including:

generating an inverse Hessian matrix recursively, based on previous training from a previous inverse Hessian matrix using a difference of a temporal inverse Hessian matrix and a proportion based on at least the feature vector, the modified feature vector, a transpose of the modified feature vector, the previous inverse Hessian matrix, and a regularization weight, the inverse Hessian matrix maintains the model parameters proportional to a weighted mean squared error between the target sequence and a future target value to avoid overfitting;

updating model parameters of the trained machine learning model for continuous online training with only newly detected time-variant characteristic data from the target sequence using the modified feature vector and the recursively generated inverse Hessian matrix;

predicting a future target value in the target sequence based on an inner product of the updated model parameters and a feature vector corresponding to the future target value; and minimizing the weighted mean squared error between the target sequence and the future target value.

15. The apparatus of claim 14, further comprising instructions, that when executed by the processor or the programmable circuitry, cause the processor or the programmable circuitry to predict a future target value in the target sequence by using the updated parameters and a feature vector corresponding to the future target value.

16. The apparatus of claim 14, wherein the processor or the programmable circuitry modifies the feature vector by executing instructions that cause the processor or the programmable circuitry to at least change the at least one element of the feature vector to 0.

17. The apparatus of claim 14, wherein the at least one element of the feature vector includes at least one intercept component of the machine learning model.

18. The apparatus of claim 14, wherein the processor or the programmable circuitry generates the inverse Hessian matrix by executing instructions that cause the processor or the programmable circuitry to at least:

calculate the temporal inverse Hessian matrix from the previous inverse Hessian matrix by using the feature vector; and calculate the inverse Hessian matrix from the temporal inverse Hessian matrix and the previous inverse Hessian matrix by using the modified feature vector.

* * * * *